United States Patent Office 3,069,482
Patented Dec. 18, 1962

---

3,069,482
CYCLOHEXANE ISOMERIZATION
Raymond N. Fleck, Whittier, and Carlyle G. Wight, Fullerton, Calif., assignors to Union Oil Company of California, Los Angeles, Calif., a corporation of California
No Drawing. Filed Sept. 22, 1958, Ser. No. 762,253
9 Claims. (Cl. 260—666)

This invention relates to the isomerization of cyclohexane and in particular concerns an improved process for treating gasoline fractions comprising cyclohexane to convert the cyclohexane to methyl cyclopentane.

The present invention is based on our discovery that cyclohexane is isomerized to methyl cyclopentane when contacted with a particular metallo alumino silicate catalyst. The invention essentially comprises an isomerization process in which a hydrocarbon feed mixture comprising cyclohexane is contacted in the vapor phase with a particular zeolitic metallo alumino silicate catalyst whereby there is obtained an isomerizate rich in methyl cyclopentane.

Considering now the process of the invention in further detail, it is generally applicable to fractions derived from hydrocarbon mixtures of the gasoline boiling range comprising naphthenic and non-naphthenic hydrocarbons, i.e., from mixtures boiling over the range between about 100° F. and about 400° F., and comprising naphthenic and non-naphthenic components ranging in molecular weight from about $C_5$ to about $C_{12}$. More particularly, the process of the invention is applicable to hydrocarbon mixtures of the gasoline boiling range comprising naphthenic hydrocarbons containing 5 or 6 carbon atoms, e.g., cyclohexane and methyl cyclopentane. A fraction boiling in the range of from about 165° F. to about 185° F. has been found particularly desirable. Such a fraction will unavoidably comprise a number of other hydrocarbons besides methyl cyclopentane and cyclohexane, particularly branched-chain heptanes and benzene. Although it is preferred to select as the feed to the isomerization reaction a cut boiling in this range of from about 165° F. to about 185° F., a fraction of somewhat wider boiling range may suitably be used. Usually, of course, such hydrocarbon mixtures are of petroleum origin. They may also be derived from coal tar, tar sand, oil shale, or other sources. Typical feed mixtures to the process include straight-run gasolines, thermally and catalytically cracked gasolines, reformates, isomerizates, etc. In general, the straight-run and cracked feeds will comprise substantially only naphthenic and paraffinic hydrocarbons. Reformates, on the other hand, comprise appreciable amounts of aromatic hydrocarbons.

The catalysts which are employed in accordance with the invention are Type X zeolitic partially dehydrated metallo alumino silicates having pores of a substantially uniform diameter between about 7 A. and about 13 A. The term "Type X zeolite" refers to those metallo alumino silicates having the so-called X crystal structure which is more fully described in British Patent No. 777,233. Certain naturally occurring minerals can be heated to dehydrate the molecule and obtain an activated zeolitic catalyst of such type. However, we greatly prefer the synthetic materials, commonly referred to as "Molecular Sieves," which are conveniently prepared by heating suitable quantities of alumina and silica with an excess of sodium hydroxide and thereafter washing out the excess caustic to obtain a crystalline zeolite X sodium alumino silicate catalyst having a typical approximate molecular structure of $[6Na_2O \cdot 6Al_2O_3 \cdot 15SiO_2]$ on a water-free basis and having a pore diameter of about 13 A. The uniform pore diameter of this product can be altered by exchanging part of the sodium cation with other metals. For example, such product can be treated with a concentrated solution of a calcium salt, e.g., calcium chloride, at superatmospheric pressure and at 65° F.–350° F., washed with water to remove excess calcium chloride, and thereafter partially dehydrated by heating to obtain a Type X calcium sodium alumino silicate catalyst having a pore diameter of about 10 A. and having a typical average molecular structure on a water-free basis corresponding to $[6CaO \cdot 6Al_2O_3 \cdot 15SiO_2]_{0.9} \cdot [6Na_2O \cdot 6Al_2O_3 \cdot 15SiO_2]_{0.1}$ Further details regarding the properties and preparation of Type X metallo alumino silicates, which are used in the process of this invention as catalysts, are to be found in British Patent No. 777,233. While any partially dehydated Type X metallo alumino silicate having a pore diameter between about 7 A. and about 13 A. may be employed in accordance with the invention, it is greatly preferred to use the 10 A. pore size calcium sodium alumino silicate referred to above. This particular product is available commercially under the trade name "Molecular Sieves 10X." These commercial materials may contain substantial amounts of inert binder materials.

The optimum particle size of the catalyst will depend upon the manner in which it is used in the process, i.e., as a fixed compact bed, a fluidized bed, etc., but is usually between about 2 and about 400 mesh, preferably between about 4 and about 30 mesh for fixed and moving compact beds and between about 100 and about 300 mesh for fluidized beds.

We are aware of the prior use of zeolitic metallo alumino silicates for the separation of straight-chain hydrocarbons from non-straight-chain hydrocarbons. The prior art disclosure, however, entails the use of the zeolite A crystal structure metallo alumino silicate having a pore diameter of about 5 A. ("Molecular Sieves 5A") as an adsorbent which will adsorb molecules of about 5 A. or less in minimum dimension, i.e., normal paraffins, normal olefins, etc., but which does not adsorb those molecules having a minimum dimension much greater than 5 A., i.e., isoparaffins, aromatics, naphthenes, etc. The process of this invention utilizes, as a catalyst, an entirely different material, i.e., a zeolite X crystal structure metallo alumino silicate having a pore diameter between about 7 A. and about 13 A., and is unique in the specific isomerization reaction which unexpectedly takes place.

As previously stated, the hydrocarbon feed mixture is contacted with the catalyst in the vapor phase. Thus, the contacting temperature is at least as high as the dew point of the feed mixture at the particular pressure employed. The pressure is usually near atmospheric but may be either subatmospheric or superatmospheric. In general, the isomerization is carried out at a temperature between about 100° F. and about 800° F., preferably between about 200° F. and about 600° F., and at pressures between atmospheric and about 1,000 p.s.i.g., preferably between about 0 p.s.i.g. and about 200 p.s.i.g. The feed is usually passed over the isomerization catalyst at a liquid hourly space velocity between about 0.1 and about 10, preferably between about 0.5 and about 2.

The following examples will illustrate several ways in which the principles of the invention may be applied but are not to be construed as limiting the same.

EXAMPLE I

An aviation gasoline is distilled and the cuts are blended to a fraction boiling in the range of 165° F.–185° F. and having a composition as follows:

|  | Volume percent |
|---|---|
| Cyclohexane | 70 |
| Methyl cyclopentane | 11 |
| Isoparaffins (includes trace of dinaphthenes) | 16 |
| Benzene | 3 |

Forty volumes of this cyclohexane cut is then contacted with a bed of partially dehydrated zeolitic calcium sodium alumino silicate isomerization catalyst ("Molecular Sieves 10X") at a temperature of about 390° F. and atmospheric pressure. With a liquid hourly space velocity of about 0.2 the isomerizate has a substantially increased methyl cyclopentane content with essentially no change in the non-naphthenic feed components. Table 1 shows the cyclohexane-methyl cyclopentane material balance for this example:

Table 1

[Basis of 40 volumes of feed]

|  | Feed | Isomerizate |
|---|---|---|
| Cyclohexane | 28.0 | 22.2 |
| Methyl cyclopentane | 4.4 | 10.2 |

EXAMPLE II

In an experiment conducted in the same manner and with the same feed as Example I, except that the liquid hourly space velocity is 1.0, there is obtained an isomerizate with substantially the same increased methyl cyclopentane content as shown in Table 1.

EXAMPLE III

A naphthenic gasoline fraction boiling in the range of 160° F.–185° F. is the feed in this example and has a composition as follows:

| | Volume percent |
|---|---|
| Cyclohexane | 34 |
| Methyl cyclopentane | 41 |
| Isoparaffins | 7 |
| Normal paraffins | 11 |
| Benzene | 7 |

Forty volumes of this gasoline feed fraction is contacted with a bed of partially dehydrated zeolitic calcium sodium alumino silicate isomerization catalyst ("Molecular Sieves 10X") at about 390° F. and about one atmosphere pressure. With a liquid hourly space velocity of about 0.2 the isomerizate has a substantially increased methyl cyclopentane content with essentially no change in the non-naphthenic feed components. Table 2 shows the cyclohexane-methyl cyclopentane material balance for this example:

Table 2

[Basis of 40 volumes of feed]

|  | Feed | Isomerizate |
|---|---|---|
| Cyclohexane | 13.6 | 9.7 |
| Methyl cyclopentane | 16.4 | 20.3 |

It is understood in the preceding examples that the thermodynamic equilibrium is not reached and as a result only partial conversion of the cyclohexane to methyl cyclopentane is usually accomplished in a one step operation. Two or more stages with appropriate recycle of unreacted cyclohexane will usually be necessary to effect substantially complete isomerization of the cyclohexane by the process of our invention. To effect such a recycle, the isomerizate is separated by conventional means, e.g., distillation, to obtain a product stream of methylcyclopentane and a recycle stream essentially comprising cyclohexane.

As will be apparent, the process of the invention essentially comprises solids-fluid contacting operations and any of the various techniques and equipment conventionally applied to such type of operation may be adapted to the practice of the invention without departing from the scope thereof. Thus, while it is often preferred to maintain the catalyst in the form of a fixed compact bed, the process is nevertheless operable in the form of a moving bed. Also the solids-fluid contacting operation may be carried out employing fluidized techniques whereby the catalyst is employed in relatively small particle size and is suspended by the flow of the fluid with which it is contacted. Other adaptable techniques and modifications will be apparent to those skilled in the art.

The present class of catalysts has relatively strong adsorptive affinity toward highly polar compounds, e.g., ethers, thioethers, water, alcohol, mercaptans, heterocyclic nitrogen, or sulfur compounds, etc. The presence of such compounds in the feed stream more or less interferes with the isomerization process of the invention and they should, accordingly, be removed prior to contacting the feed with the catalyst. Such removal can be effected in various ways, e.g., by contacting the feed with an inorganic halide such as copper chloride, calcium chloride, magnesium chloride, or the like or with a suitable partially dehydrated metallo alumino silicate.

Although the deactivation of the catalyst is gradual some deactivation may eventually occur. Thus, it is within the scope of this invention to reactivate the silicate catalyst by high temperature contacting with a hot reactivating gas, such as flue gas, air, etc.

In the foregoing specification and in the appended claims the material to which the process of the invention is applied is described as a hydrocarbon mixture comprising certain hydrocarbon components. It is to be understood, however, that the term is meant to include mixtures of hydrocarbons containing small normally incident amounts of nitrogen, sulfur and oxygen compounds.

Other modifications and adaptations which would occur to one skilled in this particular art are to be included in the spirit and the scope of this invention as defined by the following claims.

We claim:

1. A process for the isomerization of cyclohexane to methyl cyclopentane which comprises contacting in the vapor phase a hydrocarbon mixture comprising cyclohexane and other hydrocarbons boiling within the gasoline boiling range with a solid granular catalyst essentially comprising a partially dehydrated crystalline Type X zeolitic metallo alumino silicate having substantially uniform pores between about 7 A. and about 13 A. in diameter, said contacting being effected at a temperature between about 100° F. and about 800° F., at a pressure between about 0 p.s.i.g. and about 1,000 p.s.i.g., and at a liquid hourly space velocity between about 0.1 and about 10, whereby there is obtained an isomerizate enriched in methylcyclopentane; and separating said isomerizate into a methylcyclopentane product fraction which is substantially cyclohexane-free and an unconverted fraction rich in cyclohexane.

2. A process according to claim 1 wherein said catalyst comprises a partially dehydrated crystalline Type X calcium sodium alumino silicate having substantially uniform diameter pores of about 10 A.

3. A process according to claim 2 wherein said hydrocarbon mixture comprises cyclohexane and other hydrocarbons boiling within the range of about 165° F. to about 185° F.

4. A process according to claim 2 wherein said contacting is effected at a temperature between about 200° F. and about 600° F., at a pressure between about 0 p.s.i.g. and about 200 p.s.i.g., and at a liquid hourly space velocity between about 0.5 and about 2.0.

5. A process according to claim 2 wherein said hydrocarbon mixture comprises at least one of the gasolines selected from the class consisting of straight-run gasoline, thermally cracked gasoline, catalytically cracked gasoline, reformed gasoline, and isomerized gasoline.

6. A process for the isomerization of cyclohexane to methylcyclopentane which comprises contacting in the vapor phase a hydrocarbon feed mixture comprising cyclohexane and other hydrocarbons boiling within the gasoline range with a solid granular catalyst essentially comprising a partially dehydrated crystalline Type X zeolitic metallo alumino silicate having substantially uniform pores between about 7 A. and about 13 A. in diameter, said contacting being effected at a temperature between about 100° F. and about 800° F., at a pressure between about 0 p.s.i.g. and about 1,000 p.s.i.g. and at a liquid hourly space velocity between about 0.1 and about 10 whereby there is obtained an isomerizate enriched in methylcyclopentane; and separating said isomerizate into a product fraction essentially comprising methylcyclopentane and a second fraction comprising non-isomerized cyclohexane.

7. A process as defined in claim 6 wherein said feed mixture boils within the range of about 165° F. and about 185° F. and said contacting is effected at a temperature between about 200° F. and about 600° F., at a pressure between about 0 p.s.i.g. and about 200 p.s.i.g. and at a liquid hourly space velocity between about 0.5 and about 2.

8. A process for the isomerization of cyclohexane to methylcyclopentane which comprises contacting in the vapor phase a hydrocarbon mixture comprising cyclohexane in admixture with other hydrocarbons boiling within the gasoline range with a solid granular catalyst essentially comprising a partially dehydrated crystalline Type X zeolitic metallo alumino silicate having substantially uniform diameter pores between about 7 A. and about 13 A., said contacting being effected at a temperature between about 100° F. and about 800° F., at a pressure between about 0 p.s.i.g. and about 1,000 p.s.i.g. and at a liquid hourly space velocity between about 0.1 and about 10 whereby there is obtained an isomerizate which comprises a methylcyclopentane-rich fraction greatly reduced in cyclohexane; separating said isomerizate into a first and second portion, said first portion essentially comprising methylcyclopentane and said second portion comprising non-isomerized cyclohexane; and recycling said second portion of said isomerizate to said contacting.

9. A process for the isomerization of cyclohexane to methyl cyclopentane which comprises contacting in the vapor phase a hydrocarbon feed comprising cyclohexane with a solid granular catalyst essentially comprising a partially dehydrated crystalline Type X zeolitic metallo alumino silicate having substantially uniform pores between about 7 A. and about 13 A. in diameter, said contacting being effected at a temperature between about 100° F. and about 800° F., at a pressure between about 0 p.s.i.g. and about 1,000 p.s.i.g., and at a liquid hourly space velocity between about 0.1 and about 10, to produce a methylcyclopentane enriched isomerizate; and separating said isomerizate into a first and second fraction, said first fraction essentially comprising methylcyclopentane and said second fraction comprising non-isomerized cyclohexane.

References Cited in the file of this patent

UNITED STATES PATENTS

| | | |
|---|---|---|
| 1,728,732 | Jaeger | Sept. 17, 1929 |
| 2,109,866 | Moser | Mar. 1, 1938 |
| 2,834,429 | Kinsella et al. | May 13, 1958 |
| 2,858,901 | Fort | Nov. 4, 1958 |